July 20, 1965    J. V. McNULTY ETAL    3,196,041
METHOD OF MAKING A SEMICONDUCTOR GAP FOR AN INITIATOR
Filed Nov. 25, 1960
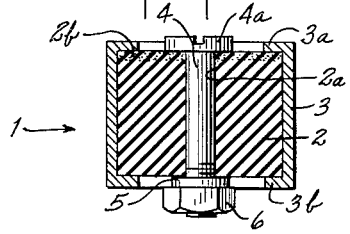
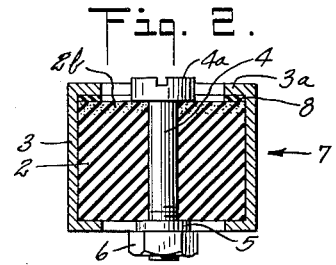
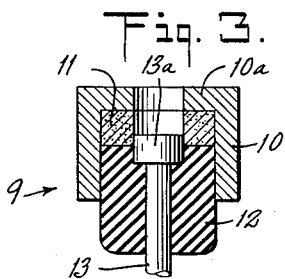
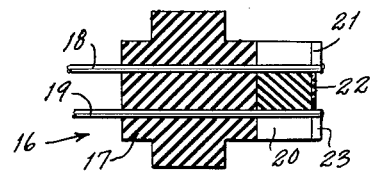
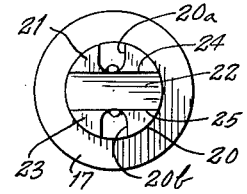
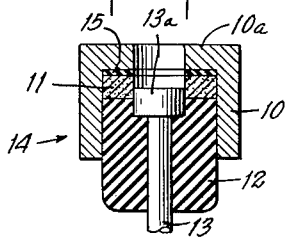
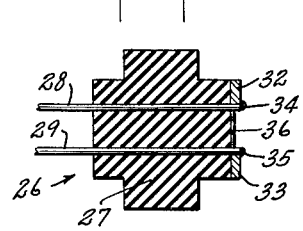
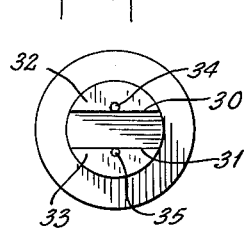
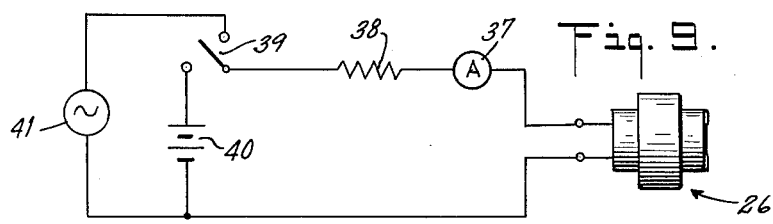
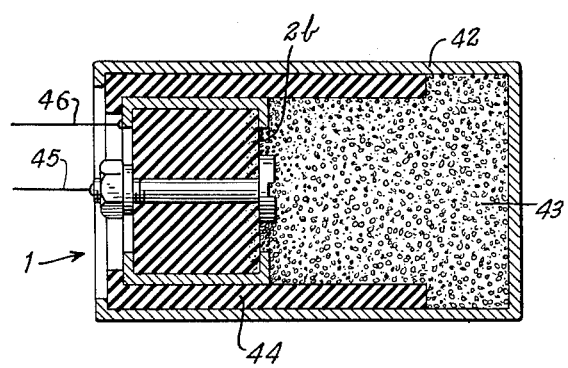
INVENTORS
JOHN V. McNULTY
LOUIS I. KNUDSON
EDWARD L. MOONEY
BY Lester W. Clark
ATTORNEY United States Patent Office 3,196,041
Patented July 20, 1965

3,196,041
METHOD OF MAKING A SEMICONDUCTOR GAP FOR AN INITIATOR
John V. McNulty, Louis I. Knudson, and Edward L. Mooney, all of Norwich, N.Y., assignors to General Laboratory Associates, Inc., Norwich, N.Y., a corporation of New York
Filed Nov. 25, 1960, Ser. No. 71,650
1 Claim. (Cl. 117—201)

This invention relates to electrical initiator devices, particularly to devices responsive to electrical energization for starting a reaction of heat sensitive and/or shock sensitive materials.

Electrical initiator devices of the prior art have for the most part been of the exploding bridge wire type. In such a device, an electrically conductive element of limited current carrying capacity, termed a bridge wire, is connected between two wires of greater capacity. When a pulse of electrical energy of predetermined intensity is sent through the wires, the bridge wire vaporizes, producing heat and a shock wave in its immediate vicinity. The bridge wire is immersed in or in contact with detonating or explosive material. The vaporizing of the bridge wire initiates the reaction of the material.

The exploding bridge wire type of initiator cannot be subjected to a test at the full electrical energy which is intended to set it off, because such a pulse destroys the bridge wire.

It is necessary, especially in certain military installations, that an electrical initiator must not initiate combustion when subjected directly to a steady electrical energy supply of a common power frequency, e.g., 110 or 220 volts, either D.C. or 60 cycles A.C., or 400 volts at 400 cycles A.C. Nevertheless, the initiator must start a reaction when subjected to a steep front electrical pulse having an amplitude of 1500 volts. It has been practically impossible to meet both of these specifications with an exploding bridge wire type of initiator.

An object of the present invention is to provide an electrical initiator which may be non-destructively tested at its full rated energy.

Another object of the invention is to provide an initiator which will start a reaction when subjected to an electrical pulse having a steep wave front and a predetermined amplitude, but which will not start a reaction when subjected to a steady source of electrical energy having a potential of lower amplitude.

A further object of the invention is to provide an electrical initiator having a gap between two electrodes defined at least in part by a semiconductive surface.

A further object is to provide an initiator of the type described in which the semiconductor surface spans the gap between the two electrodes.

A further object is to provide an initiator of the type described in which the semiconductive surface spans a portion only of the gap between the two electrodes and an insulating member is provided to span the remainder of the gap.

A further object is to provide an initiator of the type described in which the semiconductive surface is electrically desensitized against activation by energy from a soure of predetermined electrical characteristics.

Another object is to provide improved methods of making initiators of the type described.

The foregoing and other objects of the invention are attained in the structures and methods described herein.

In one modification of the invention, the initiator comprises two conductive electrodes and a gap between the electrodes spanned by a member of insulating material having a semiconductive region applied to one surface by impregnation.

In another modification of the invention, the gap between the electrodes is spanned partly by the semiconductor surface and partly by an insulating member.

In another modification of the invention, the insulating member between the two electrodes is replaced by a member consisting only of semiconductive material. In still another modification, an insulating member is used together with the semiconductive member to define the gap.

In still another modification of the invention, the semiconductive material consists of a coating applied as by painting on a surface of an insulating member.

According to a further feature of the invention, a method is disclosed for treating initiators formed with a surface layer of semiconductive material to render them insensitive to steady sources of electrical energy of predetermined characteristics. According to this method, the initiator is connected in a series circuit with the steady source in question and with a current limiting device. When the circuit is first applied, the semiconductor portion of the initiator may give off sparks and portions of it may become red hot. By maintaining the circuit for a brief interval, the current through the semiconductive layer decreases with time as the portions of the semiconductive material are removed, for example, by being evaporated, sputtered away or oxidized. The circuit may be readily maintained for a time long enough so that the current drops below a predetermined value which cannot cause a reaction at the initiator. The circuit may then be opened. The initiator will not thereafter produce a spark when energized by current from a source having similar characteristics, but will readily produce a spark when energized by a steep wave front pulse having a substantially higher potential than was used in the process described.

When in use, initiators according to the present invention are placed with their semiconductive gaps in direct contact wtih the reactive material to be deflagrated or exploded.

Other objects and advantages of the invention will become apparent from a consideration of the following specification and claims, taken together with the accompanying drawing.

In the drawing:

FIG. 1 is a cross-sectional view on an enlarged scale, of one form of semiconductor initiator embodying the invention;

FIGS. 2, 3 and 4 are similar cross-sectional views of modified forms of semiconductor initiators embodying the invention;

FIG. 5 is a cross-sectional view, on an enlarged scale, of still another modified form of semiconductor initiator embodying the invention;

FIG. 6 is a right-hand elevational view of the initiator of FIG. 5;

FIG. 7 is a cross-sectional view similar to FIG. 5, but showing a modification;

FIG. 8 is a right-hand elevational view of the initiator of FIG. 7;

FIG. 9 is an electrical wiring diagram illustrating one step in the process of making an initiator which step may be used in connection with the initiators of FIGS. 1, 5 and 7; and FIG. 10 is a cross-sectional view, on an enlarged scale, of a complete squib or detonator in which the initiator of FIG. 1 is used.

FIG. 1

This figure shows an initiator generally indicated by the reference numeral 1, including an insulator body 2 of cylindrical form and having a hole 2a passing through it along its vertical axis. The insulator body 2 is preferably a ceramic, for example, aluminum oxide. The upper end surface of the insulator 2 is impregnated with a semiconductor material, which may, for example, be copper oxide.

A suitable ceramic body material, a suitable impregnating semiconductor material, and a process for making the impregnated ceramic body are disclosed and claimed in United States Patent No. 2,861,014, issued November 18, 1958, to Shay J. Sheheen and Edward L. Mooney, entitled Process of Making a Semiconductive Ceramic Body.

The insulator body 2 is inserted in a tight fitting hollow cylindrical metal shell 3 having at its upward end an inwardly directed flange 3a which abuts against the semiconductive surface 2b. After the insulator body is inserted in the shell 3, the lower end of the shell 3 is rolled over, as shown at 3b, to hold the shell 3 and the body 2 tightly together. A metal bolt 4 is inserted through the hole 2a in the insulator body 2. The metal bolt 4 has a flange head 4a, whose under surface engages the semiconductive material 2b. The bolt 4 is threaded at its lower end, and is encircled by a washer 5 and a nut 6 to hold the bolt head 4a against the surface 2b. The flange 3a and the bolt head 4a serve as the two electrodes of the initiator. The annular gap between the electrodes is defined at the bottom of the gap by the semiconductive material 2b.

When an electrical potential is applied across a gap between two electrodes spanned by a semiconductive surface, the gap breaks down first by conduction along the surface. Very shortly after this initial surface conduction, the gap becomes ionized and breaks down with a typical spark between the electrodes.

The initiator 1 will produce a spark across the annular gap between the flange 3a and bolt head 4a, in response to a steep wave front electrical pulse having a potential greater than the breakdown potential of the gap. The conductivity of the semiconductive layer 2b is not subject to close control by the usual methods of manufacture. Consequently, the initiator 1 may also produce a spark when subject to a steady source of electrical energy such as is commonly used to supply electrical power, e.g., 110 volts D.C. or 110 volts A.C. 60 cycles.

There is disclosed in the copending application of John V. McNulty, Louis I. Knudson and David J. Wright, Serial No. 71,807, filed November 25, 1960, an electrical system for energizing an initiator in a manner such that the initiator is guarded against accidental supply of energy from steady sources of electrical energy. When used with such a system, the initiator of FIG. 1 may be entirely safe, even in a situation where the design requirements specify that it must not respond to energization from a steady source.

The initiator 1 may also be modified by the process described below in connection with FIG. 9, so that it will not break down and form a spark when energized by a steady power potential.

FIG. 2

This figure shows an initiator 7 which is similar to the initiator 1 of FIG. 1, except that it has been modified so that it will not respond to energization from a steady source of electrical energy of a predetermined potential. Most of the elements in the initiator 7 are the same as the corresponding elements of FIG. 1 and have been given the same reference numerals, and will not be further described. The only new element is an insulating washer 8 of mica or similar material, which is inserted between the flange 3a and the semiconductive surface 2b.

When a steady source of electrical energy is applied between the electrodes 3 and 4, that potential appears across the gap between the inner edge of the flange 3a and the semiconductive surface 2b, i.e., across the vertical inner surface of the washer 8. By the insertion of the insulating washer 8, the surface conductive breakdown phenomenon described in connection with FIG. 1 is suppressed for voltages lower than that necessary to break down a gap whose length is equal to the thickness of the washer 8. By properly designing the washer 8, the initiator 7 may be made to "hold off" any reasonable value of applied potential. It should, of course, be noted that the radial distance between the flange 3a and the bolt head 4a must always be greater than the thickness of the washer 8, if the thickness of the washer 8 is to be the determining factor in establishing the minimum breakdown potential.

The inner edge of the washer 8 should preferably be aligned with the inner edge of the flange 3a, as shown. The washer 8 may be undercut so that an air gap exists between parallel surfaces of the flange 3a and the semiconductive surface 2b, if desired. If the washer 8 projects beyond the flange 3a, then a minimum gap between flange 3a and semiconductive surface 2b is increased and the breakdown potential is increased accordingly.

FIG. 3

This figure illustrates a different, somewhat simpler embodiment of the invention. This figures illustrates an initiator 9 including an outer metal cylinder 10 having an inwardly directed flange 10a at its upper end. A ring 11 of semiconductive material, for example, ferrite, is inserted in the cylinder 10 and abuts the flange 10a, with its inner surface aligned with the inner surface of the flange 10a. An insulating member 12 is inserted into the open lower end of the cylinder 10 and abuts the lower surface of the semiconductive ring 11. An electrode 13 having a head 13a of larger diameter extends through an aperture along the axis of the insulating member 12 and has a portion of the head 13a in contact with the inner surface of the semiconductive element 11.

The initiator gap is in this case between the flange 10a and the upper end of the electrode head 13a and is across the vertical semiconductive surface of the element 11. The gap breaks down in a manner similar to that described in connection with the initiator 1. The characteristics of the gap are similar. The various parts of the initiator 9 may be bonded together by the use of any suitable bonding agent.

FIG. 4

This figure illustrates a modification of the initiator of FIG. 3, generally indicated by the reference numeral 14. The only difference between the initiator 14 and the initiator 9 is the addition of an insulating washer 15, corresponding in structure and function to the washer 8 of FIG. 2. The use of the washer 15 makes the initiator 14 suitable for use in installations where the initiator is required to hold off applications of steady electrical power of a predetermined potential.

FIGS. 5 AND 6

These figures illustrate still another type of initiator embodying the invention. The initiator is generally indicated by the reference numeral 16 and comprises a base 17, of insulating material, with two wires 18 and 19 extending through holes provided to receive the wires. Against the right-hand end of the base 17, as viewed in FIG. 5, there is mounted another insulator member 20, preferably of ceramic material, such as aluminum oxide. The member 20 is generally cylindrical, but is provided with upper and lower grooves 20a, 20b extending radially inwardly from its upper and lower extremities. The inner ends of the grooves 20a 20b are aligned with the wires 18 and 19, so that the wires are adjacent and may extend through the grooves. The right-hand face of the ceramic element 20, as viewed in FIG. 5, is divided into three zones by lines 24 and 25 which extend horizontally in FIG. 6 and which are tangent to the inner ends of the grooves 20a and 20b. The zone 21 above line 24 and the zone 23 below line 25 are provided with a metalized coating by any of several known procedures for providing a metal coating on ceramics. The ends of the wires 18 and 19 are soldered to the metalized coatings 21 and 23.

The zone 22 between the line 24 and 25 is provided with a coating of semiconductive material. This coating may be applied by using a suspension of a suitable semiconductive material in a suitable vehicle. For example, a suspension of lampblack in linseed oil may successfully be used. The particular semiconductive material and the particular vehicle are not critical. It is preferred that the mixture of the semiconductive material and the vehicle be somewhat thicker than is best for easy application. In other words, the proportion of the semiconductive material should be somewhat greater than is usually used in mixtures which are to be spread as by painting. The reason for making the mixture thicker is that a continuous semiconductive path is desired between the two metallic coatings 21 and 23. If the proportion of the vehicle is made too great, then, after the mixture dries, the dried vehicle may serve as an insulator between particles of the semiconductive material. By making a suspension of lampblack as a sort of thick paste, the production of an effective semiconductive layer may be assured.

By careful control of the proportions of the semiconductive materials and its vehicle, and by careful control of the applied thickness, a semiconductive layer can be produced at 22 which will break down upon the supply of electrical energy in the form of a steep wave front impulse, but which will "stand off" application of steady electrical energy at a lower amplitude potential. However, even if the layer 22 as first constructed does not "stand off" a power source of the required characteristics, it may be modified to resist that power supply effectively by the process described below in connection with FIG. 9.

FIGS. 7 AND 8

These figures illustrate an initiator 26 which is somewhat similar to the initiator of FIGS. 5 and 6, but is considerably simplified. The initiator 26 comprises a single insulator body 27, of ceramic material, for example aluminum oxide, with two wires 28 and 29 extending through holes provided in the body 27. The right-hand surface of the body 27, as it appears in FIG. 7, is divided into three zones, by the lines 30 and 31 which extend horizontally in FIG. 8. The zone above the line 30 is provided with a metalized coating 32. The zone below the line 31 is provided with a metalized coating 33. The ends of the wires 28 and 29 extend into proximity with the coatings 32 and 33, respectively, and are soldered to them, as shown at 34 and 35. The zone between the lines 30 and 31 is provided with a coating 36 of semiconductive material which may be similar to the coating 22 described in connection with FIGS. 5 and 6.

FIG. 9

This figure illustrates a method of modifying the characteristics of a semiconductive surface gap such as those illustrated in connection with the initiators of FIGS. 1, 5 and 7. As shown in FIG. 9, an initiator 26 is connected in a simple series circuit which includes an ammeter 37, a load limiter resistor 38 and a switch 39. The switch 39 may be moved between one circuit closing position where it connects a battery 40 in the circuit and another circuit closing position where it connects a source of alternating current 41 in the circuit.

After the initiator is first made, it is connected in the circuit as shown. The battery 40 and the alternating current source 41 must have the characteristics which it is desired to have the initiator withstand without the production of a spark discharge. The switch 39 is then closed in one of its positions and held there until the current through the ammeter 37 drops below a predetermined value. For 110 volts D.C. from the battery 40, the current may be reduced to a few milliamperes. When the circuit is first closed, there may appear sparks and red hot portions in the semiconductive layer 36. As the circuit is maintained, these sparks and hot portions will be effectively removed for example, by sputtering, vaporization, or burning of portions of the semiconductive layer. That activity will continue and the current flow through the ammeter 37 will decrease, approaching zero as a limit. The resistor 38 may be any suitable current limiter, for example, a conventional electric lamp.

After the initiator 26 has been treated to reduce the current from the battery 40 to the required level, it may then be given a similar treatment from the alternating current source 41. It is not necessary to use both A.C. and D.C. sources on one initiator. Whatever the specifications to be met, as to the "standing off" of power supplies, a surface layer of semiconductive material can be produced in this fashion to meet them. By the process just described, semiconductive surface layer may be electrically desensitized against activation by enregy from a source of predetermined electrical characteristics.

The method of FIG. 9 is not effective with structures such as shown at 9 and 14 in FIGS. 3 and 4 wherein the semiconductive material has a substantial depth, rather than consisting of a thin layer.

FIG. 10

This figure illustrates an initiator 1 of FIG. 1 in place as a part of a squib or detonator. The squib consists of an outer casing 42 enclosing a charge 43 of explosive or detonating material. A cylindrical insulating member 44 is provided between the casing 42 and the initiator 1. Note that the semiconductive surface 2b of the initiator is in direct contact with the charge 43. It is necessary, of course, that the charge 43 be electrically insulating. The wires 45 and 46 are connected to the electrodes of the initiator for setting off the charge.

While we have shown and described certain preferred embodiments of our invention, other modifications thereof will readily occur to those skilled in the art, and we therefore intend our invention to be limited only by the appended claim.

We claim:
The method of making an initiator gap, comprising the steps of:
(1) coating a member of insulating material with a suspension of semiconductive particles in a vehicle to form a layer on said member;
(2) drying the suspension so that the dried vehicle serves as an insulator between the semiconductive particles;
(3) connecting spaced localities of the layer in series with a current limiter and a steady source of electrical energy having a predetermined potential;
(4) maintaining said connection until the current flow through the layer drops below a predetermined value and is not accompanied by sparking or glowing, thereby rendering the gap between said spaced localities ineffective to produce sparks upon subsequent application thereto of electrical energy from a source having characteristics similar to said steady source.

References Cited by the Examiner

UNITED STATES PATENTS

| | | | |
|---|---|---|---|
| 2,699,158 | 1/55 | Purdy et al. | |
| 2,942,546 | 6/60 | Liebhafsky et al. | 102—28 |
| 2,960,933 | 11/60 | Scherrer | 102—28 |
| 2,996,944 | 8/61 | Chessin et al. | 102—28 |
| 3,018,732 | 1/62 | Togmola | 102—46 X |
| 3,019,732 | 2/62 | Kaspaul | 102—28 |
| 3,059,576 | 10/62 | Haefner | 102—28 |

FOREIGN PATENTS

| | | |
|---|---|---|
| 812,128 | 4/59 | Great Britain. |
| 348,084 | 9/60 | Switzerland. |

GEORGE N. WESTBY, *Primary Examiner.*

ARTHUR GAUSS, DAVID J. GALVIN, *Examiners.*